US012406794B2

(12) United States Patent
Nakanishi

(10) Patent No.: US 12,406,794 B2
(45) Date of Patent: Sep. 2, 2025

(54) REACTOR AND METHOD OF MANUFACTURING THE SAME

(71) Applicant: TOYOTA JIDOSHA KABUSHIKI KAISHA, Toyota (JP)

(72) Inventor: Koji Nakanishi, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 681 days.

(21) Appl. No.: 17/854,666

(22) Filed: Jun. 30, 2022

(65) Prior Publication Data

US 2023/0011050 A1 Jan. 12, 2023

(30) Foreign Application Priority Data

Jul. 12, 2021 (JP) ................................ 2021-115116

(51) Int. Cl.

| | |
|---|---|
| ***H01F 27/28*** | (2006.01) |
| ***H01F 27/02*** | (2006.01) |
| ***H01F 27/24*** | (2006.01) |
| ***H01F 27/32*** | (2006.01) |

(52) U.S. Cl.

CPC ....... *H01F 27/2876* (2013.01); *H01F 27/022* (2013.01); *H01F 27/24* (2013.01); *H01F 27/327* (2013.01)

(58) Field of Classification Search

CPC .................................................. H01F 27/2876

USPC ........................................................... 336/55

See application file for complete search history.

(56) References Cited

FOREIGN PATENT DOCUMENTS

| | | |
|---|---|---|
| JP | 2016-092313 A | 5/2016 |
| JP | 2016-171099 A | 9/2016 |
| JP | 2019-050286 A | 3/2019 |

*Primary Examiner* — Ronald Hinson

(74) *Attorney, Agent, or Firm* — Dinsmore & Shohl LLP

(57) ABSTRACT

A reactor includes a coil having gaps between adjacent turns of a winding, a core inserted through the coil, and a heat-dissipating material that is in contact with a side face of the coil. The heat-dissipating material is inserted between the adjacent turns of the winding of the coil, and the thickness of the heat-dissipating material outside the coil in a direction of an axis of the coil is smaller than the thickness of the heat-dissipating material between the adjacent turns of the winding. By reducing the thickness of the heat-dissipating material outside the coil where contribution to coil cooling is small, the amount of the heat-dissipating material can be reduced without lowering the cooling performance to the coil.

7 Claims, 4 Drawing Sheets

REACTOR AND METHOD OF MANUFACTURING THE SAME

CROSS-REFERENCE TO RELATED APPLICATION

This application claims priority to Japanese Patent Application No. 2021-115116 filed on Jul. 12, 2021, incorporated herein by reference in its entirety.

BACKGROUND

1. Technical Field

The technology disclosed in this specification relates to a reactor having a core inserted through a coil and method of manufacturing the reactor.

2. Description of Related Art

Reactors each including a heat-dissipating material (heat-dissipating sheet) that is in contact with a side face of a coil are disclosed in Japanese Unexamined Patent Application Publication No. 2019-050286 (JP 2019-050286 A) and Japanese Unexamined Patent Application Publication No. 2016-092313 (JP 2016-092313 A). The heat-dissipating material absorbs heat of the coil. In other words, the heat-dissipating material cools the coil. In order to effectively cool the coil, the heat-dissipating material is inserted between adjacent turns of a wiring of the coil.

SUMMARY

The specification provides a reactor and a method of manufacturing the reactor.

A first aspect of the disclosure provides a reactor. The reactor includes a coil having a gap between adjacent turns of a winding, a core inserted through the coil, and a heat-dissipating material that is in contact with a side face of the coil. The heat-dissipating material is inserted between the adjacent turns of the winding of the coil. The thickness of the heat-dissipating material outside the coil in a direction of an axis of the coil is smaller than the thickness of the heat-dissipating material between the adjacent turns of the winding. By reducing the thickness of the heat-dissipating material outside the coil where its contribution to coil cooling is small, it is possible to reduce the amount of the heat-dissipating material, without lowering the cooling performance to the coil.

In the reactor according to the first aspect, the heat-dissipating material may surround the winding in a cross section cut in a plane passing the axis of the coil and the heat-dissipating material. The heat-dissipating material, which surrounds the wiring, is less likely or unlikely to peel off from the winding. Also, the heat-dissipating material may be in contact with the core. The heat-dissipating material can also contribute to cooling of the core.

In the reactor according to the first aspect, on one side of the coil with which the heat-dissipating material is in contact, a spacing between the adjacent turns of the winding may be wider as a distance from the core is larger. According to this structure, when the spacing between the turns of the wiring is wider as the distance from the core is larger, the heat-dissipating material filling the gap between the turns is less likely or unlikely to peel off.

In the reactor according to the first aspect, the reactor may further include a resin cover that covers the coil and the core such that the coil is exposed at one side.

A second aspect of the disclosure provides a manufacturing method suitable for the reactor in which the spacing between adjacent turns of the wiring is wider as the distance from the core is larger. The manufacturing method includes first to third processes. In a first process, a coil having a gap between adjacent turns of a winding, and a core inserted through the coil, are set in a mold. In a second process, while a force parallel to an axis of the coil is applied to one side of the axis of the coil such that one end of the gap becomes wider than the other end as seen in a side view of the coil, a resin cover that covers the coil and the core is formed such that the coil is exposed at one side. In a third process, a heat-dissipating material is formed which enters the gap between the turns and is in contact with a side face of the coil in a portion of the coil that is exposed from the resin cover.

In the method according to the second aspect, the coil may be sandwiched between a pressure pin and a receiving pin, and the force parallel to the axis is applied by the pressure pin.

In the method according to the second aspect, the resin cover may be formed by injecting molten resin into a cavity of the mold, and is taken out of the mold.

In the method according to the second aspect, the heat-dissipating material may be formed such that a thickness of the heat-dissipating material outside the coil in a direction of the axis is smaller than a thickness of the heat-dissipating material in the gap.

Details of the technology disclosed in this specification and further improvements will be described in "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
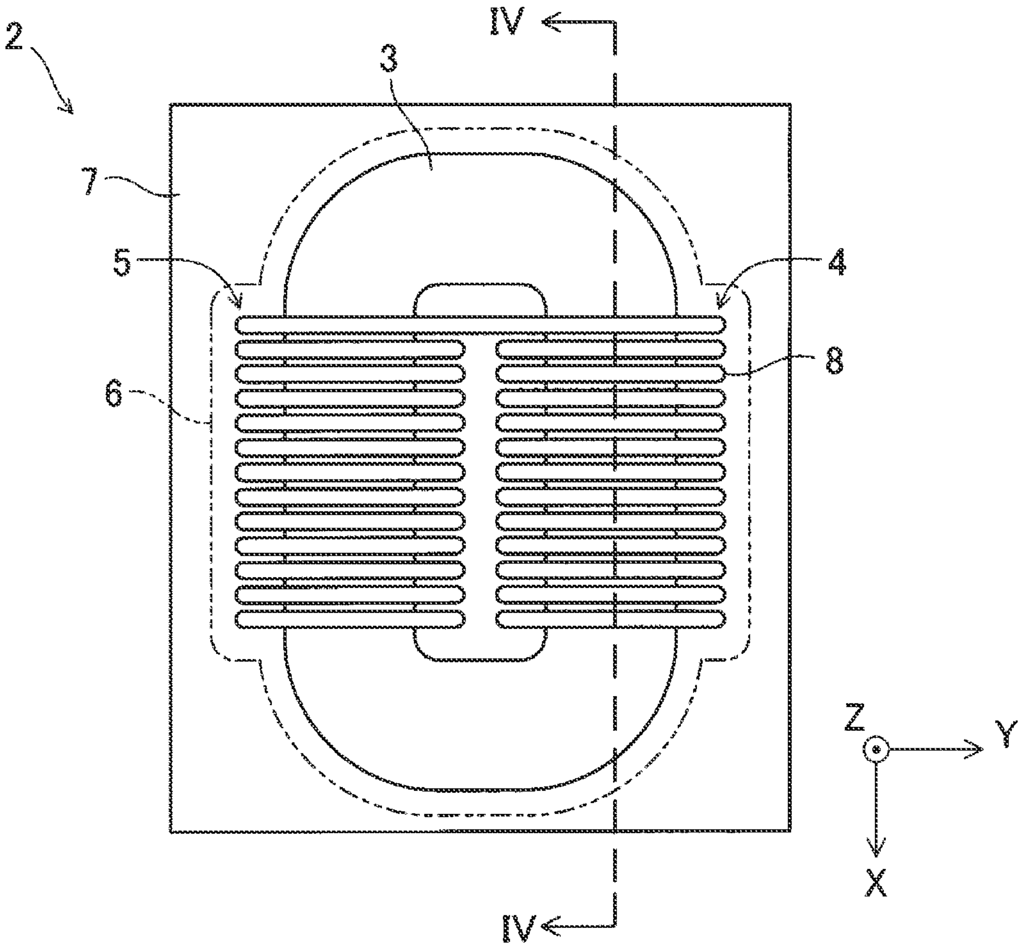
FIG. 1 is a plan view of a reactor of a first embodiment.
Figure 2:
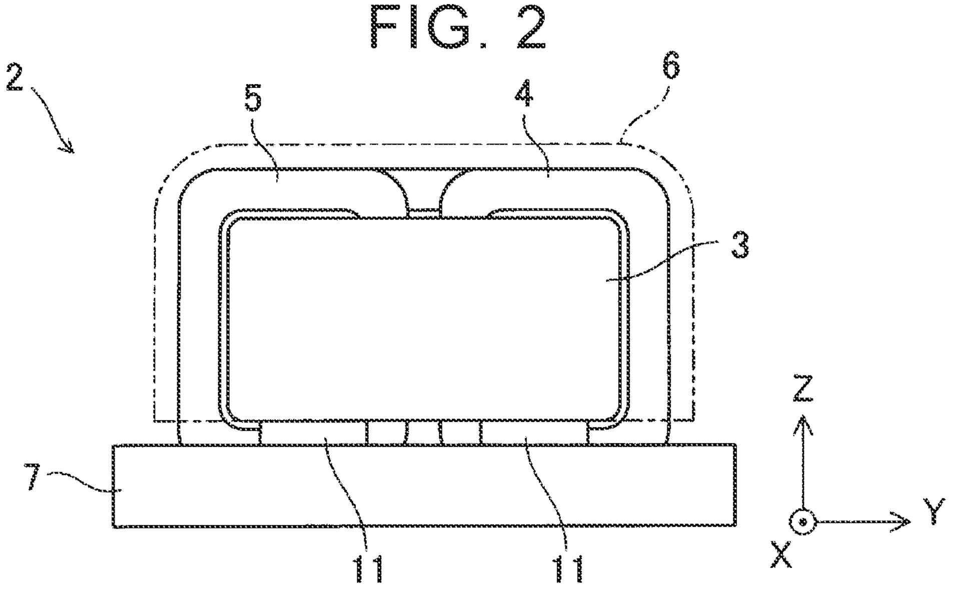
FIG. 2 is a front view of the reactor of the first embodiment.
Figure 3:
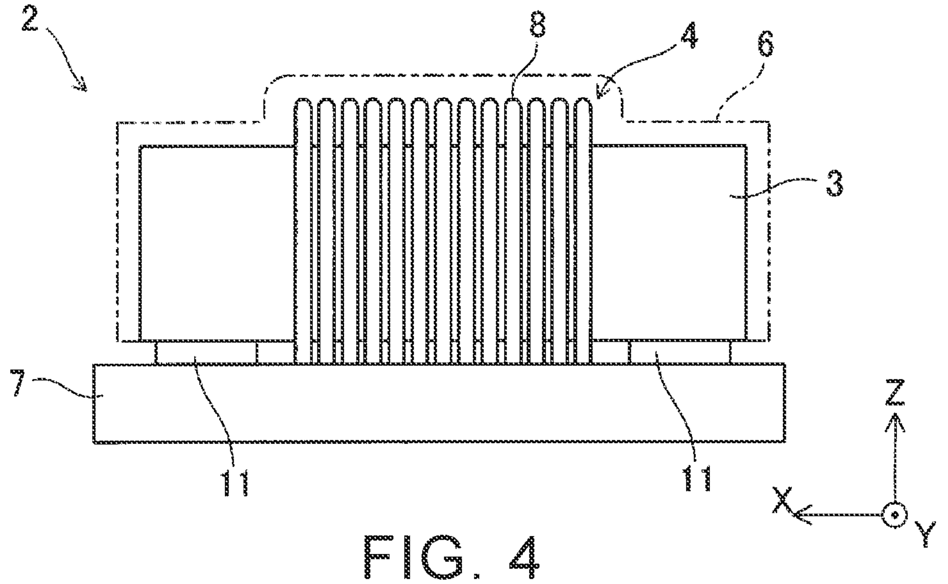
FIG. 3 is a side view of the reactor of the first embodiment.

Referring to the drawings, a reactor 2 of a first embodiment will be described. FIG. 1, FIG. 2, and FIG. 3 are a plan view, front view, and side view of the reactor 2, respectively.

A core 3 and coils 4, 5 are partially covered with a resin cover 6. The resin cover 6 is depicted with a virtual line, for the better understanding.

The reactor 2 includes a ring-shaped core 3, two coils 4, 5, a base 7, a resin cover 6, and a heat-dissipating material 9. The heat-dissipating material 9 is not seen in FIG. 1 to FIG. 3, but shown in the cross-sectional view of FIG. 4. The core 3 is inserted through the two coils 4, 5. The core 3 extends outward from the coil 4 (the coil 5) in the axial direction of the coil 4 (the coil 5). The two coils 4, 5 are made from a single winding 8, and electrically form a single coil. Leading wires of the coils 4, 5 are not illustrated in the drawings.

The coils 4, 5 have gaps between adjacent turns of the winding 8. The assembly of the core 3 and coils 4, 5 is fixed to the base 7. Spacers 11 are fixed to the base 7, and the core 3 is fixed to the top faces of the spacers 11. Although not illustrated in the drawings, the resin cover 6 may be provided with tabs, and the tabs may be fixed to the base 7.

While exposing the lower parts of the coils 4, 5 and the lower surface of the core 3, the resin cover 6 indicated by the virtual line covers the remaining parts of the coils 4, 5 and the remaining part of the core 3.

Figure 4:
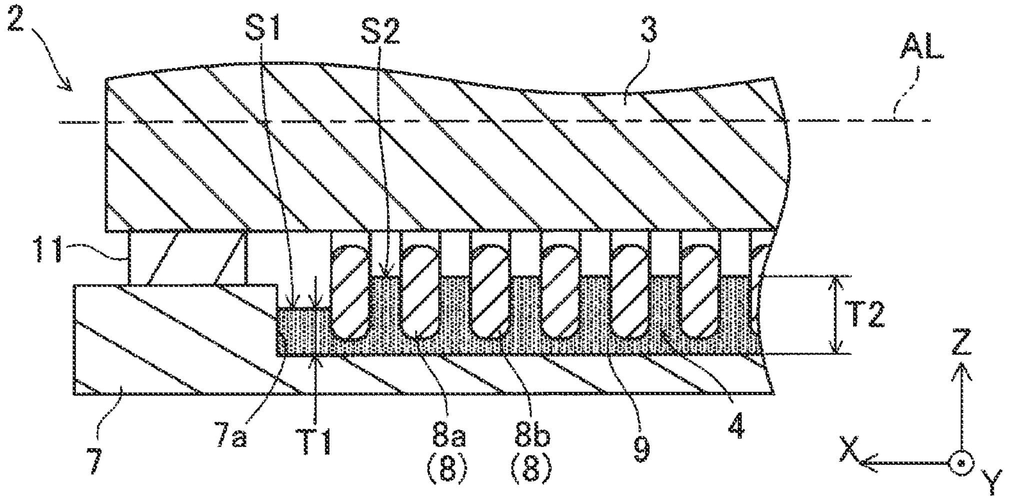
FIG. 4 is a cross-sectional view taken along line IV-IV in FIG. 1.

FIG. 4 shows a cross section taken along line IV-IV in FIG. 1. A part of the cross section of the reactor 2 is omitted in FIG. 4. The one-dot chain line AL in FIG. 4 indicates the axis of the coil 4 (the axis AL). In FIG. 4, some turns of the winding are not denoted by reference sign 8. Reference signs 8*a*, 8*b* individually denote respective turns of the winding 8. As shown in FIG. 4, the winding 8 is a flat rectangular wire with a flat cross section. In the coil 4 (coil 5), the flat rectangular winding 8 is wound edgewise. The "edgewise winding" means that the flat rectangular wire is wound such that its broad faces face in the direction of the axis AL.

The heat-dissipating material 9 is in contact with the lower surface of the coil 4. The cross section of the reactor 2 in FIG. 4 is cut in a plane that passes the axis AL of the coil 4 and the heat-dissipating material 9. Although not illustrated in the drawings, the heat-dissipating material 9 is also in contact with the lower surface of the coil 5. The structural relationship between the heat-dissipating material 9 and the coil 5 is the same as the structural relationship between the heat-dissipating material 9 and the coil 4. Thus, only the relationship between the heat-dissipating material 9 and the coil 4 will be described.

The heat-dissipating material 9 is made of a flexible material with high heat resistance and high thermal conductivity. The heat-dissipating material 9 is made of silicon rubber, for example. A recess 7*a* is provided in the base 7, and the heat-dissipating material 9 is placed in the recess 7*a*. The heat-dissipating material 9 is in contact with one side face (lower surface) of the coil 4, and is also inserted between adjacent turns (e.g., turns 8*a*, 8*b*) of the winding 8. The heat-dissipating material 9 is in contact with the base 7 as well as the coil 4. The base 7 is made of aluminum having high thermal conductivity. When current flows through the coil 4, the coil 4 generates heat. The heat of the coil 4 is transferred to the base 7 via the heat-dissipating material 9. The heat of the coil 4 is released via the heat-dissipating material 9 and the base 7. A water-cooled cooler may be installed under the base 7.

The heat-dissipating material 9 extends to the outside of the coil in the direction of the axis AL. As shown in FIG. 4, the thickness T1 of the heat-dissipating material 9 outside the coil in the direction of the axis AL is smaller than the thickness T2 of the heat-dissipating material 9 between adjacent turns (e.g., the turns 8*a*, 8*b*) of the winding. In other words, the surface S1 of the heat-dissipating material 9 outside the coil in the direction of the axis AL is spaced by a larger distance from the core 3 than the surface S2 of the heat-dissipating material 9 between adjacent turns (e.g., the turns 8*a*, 8*b*) of the winding.

The heat-dissipating material 9 filling gaps between adjacent turns of the winding 8 absorbs heat of both turns (e.g., the turns 8*a*, 8*b*) of the winding. On the other hand, the heat-dissipating material 9 outside the coil in the direction of the axis AL contacts at only one side with the winding 8 (the outermost turn in the direction of the axis AL). Contribution of the heat-dissipating material 9 outside the coil in the direction of the axis AL of the coil 4 to cooling of the coil is smaller than that of the heat-dissipating material 9 between adjacent turns of the winding 8. By reducing the thickness of the heat-dissipating material 9 in its portion where contribution to coil cooling is small, it is possible to reduce the amount of the heat-dissipating material 9, without lowering the cooling performance to the coil 4.

Second Embodiment

Figure 5:
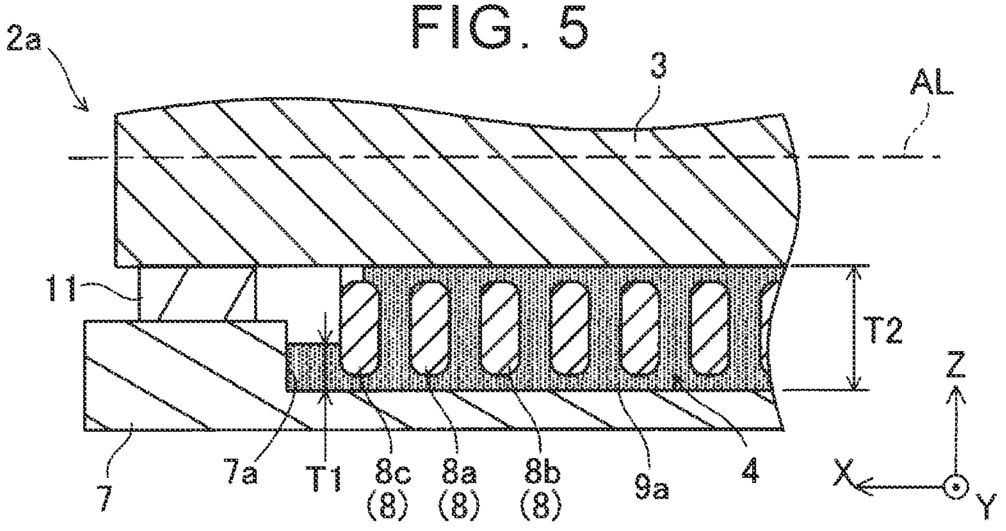
FIG. 5 is a cross-sectional view of a reactor of a second embodiment.

FIG. 5 shows a cross section of a reactor 2*a* of a second embodiment. The cross section of FIG. 5 corresponds to the cross section of FIG. 4. In the reactor 2*a*, a heat-dissipating material 9*a* surrounds the winding (e.g., turns 8*a*, 8*b*) of the coil 4, in a cross section cut in a plane passing the axis AL of the coil 4 and the heat-dissipating material 9*a*. In other words, the heat-dissipating materials 9*a* located on both sides of the winding in the direction of the axis AL are connected between the winding and the core 3. In other words, in the cross section of FIG. 5, except for the turn 8*c* located at one end in the direction of the axis AL, the heat-dissipating material 9*a* fills the surroundings of the other turns of the winding 8. With the heat-dissipating material 9*a* thus surrounding the turns (excluding the end turn 8*c*) of the winding 8, the heat-dissipating material 9*a* is less likely or unlikely to peel off from the winding 8.

The heat-dissipating material 9*a* is also in contact with the core 3. The heat-dissipating material 9*a*, which is in contact with the core 3, can also absorb heat of the core 3. In the reactor 2*a* of the second embodiment, too, the thickness T1 of the heat-dissipating material 9*a* outside the coil in the direction of the axis AL is smaller than the thickness T2 of the heat-dissipating material 9*a* between adjacent turns of the winding 8.

Third Embodiment

Figure 6:
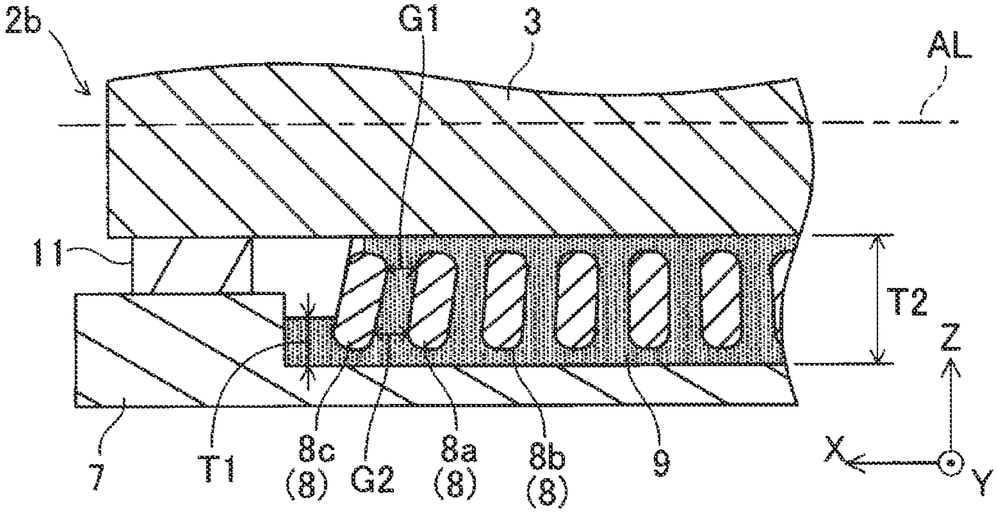
FIG. 6 is a cross-sectional view of a reactor of a third embodiment.

FIG. 6 shows a cross section of a reactor 2*b* of a third embodiment. The cross section of FIG. 6 corresponds to the cross section of FIG. 4. In the reactor 2*b*, the spacing between adjacent turns of the winding 8 on the side that is in contact with the heat-dissipating material 9 is wider as the distance from the core 3 is larger. For example, the spacing G2 between the turn 8*a* and the turn 8*c* on the side remote from the core 3 is wider than the spacing G1 on the side close to the core 3. The spacing between the turn 8*a* and the turn 8*b* is also wider as the distance from the core 3 is larger. This applies to the other turns of the winding. When the spacing between adjacent turns of the winding 8 is wider as the distance from the core 3 is larger, the heat-dissipating material 9 filling gaps between the turns of the winding 8 is less likely or unlikely to peel off. In this connection, it suffices that the spacing between at least one pair of turns of the winding is wider as the distance from the core 3 is larger. In some of the gaps, the spacing may be constant. In the reactor 2*b* of the third embodiment, too, the thickness T1 of the heat-dissipating material 9 outside the coil in the direction of the axis AL is smaller than the thickness T2 of the heat-dissipating material 9 between adjacent turns of the winding 8.

Referring next to FIG. 7 to FIG. 10, a method of manufacturing a reactor 12 will be described. The reactor 12 includes a straight core 13, one coil 14, a resin cover 16, and a heat-dissipating material 19 (see FIG. 10).

First Process

Figure 7:
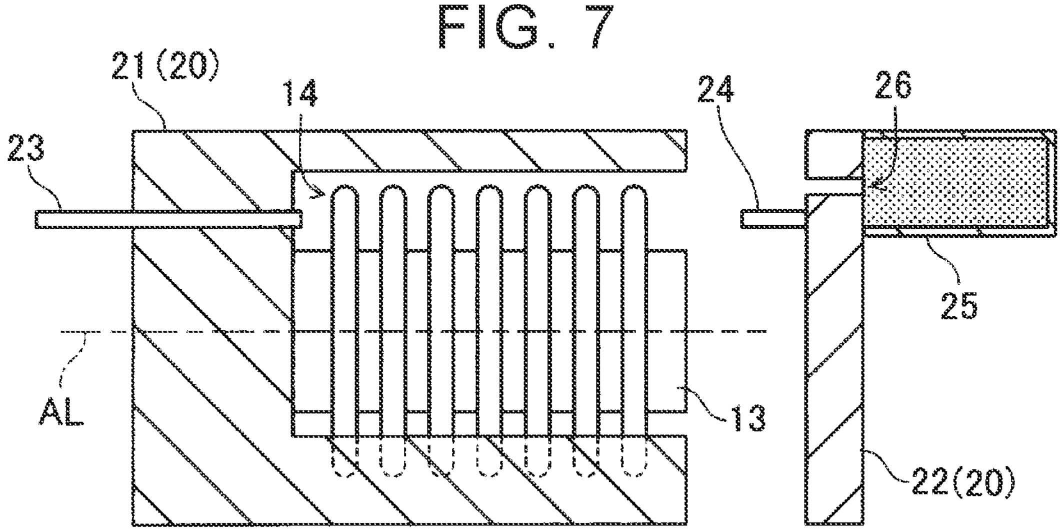
FIG. 7 is a view useful for describing a first process of a method of manufacturing a reactor.

Initially, the coil 14 having gaps between adjacent turns of the winding and the core 13 inserted through the coil 14 are set in a mold 20 (FIG. 7). The mold 20 consists of a first mold 21 and a second mold 22. FIG. 7 shows a condition where the assembly of the coil 14 and the core 13 is set in the first mold 21. The lower end of the coil 14 is covered with the first mold 21. The first mold 21 is provided with a pressure pin 23 that will be used later for pressing the coil 14 in the direction of the axis AL (the axis AL of the coil 14). The second mold 22 is provided with a receiving pin 24 that cooperates with the pressure pin 23 to sandwich the coil 14 therebetween. A plunger 25, which stores molten resin, is attached to the second mold 22. Before the mold 20 is closed, a gate 26 of the plunger 25 is closed.

Second Process

Figure 8:
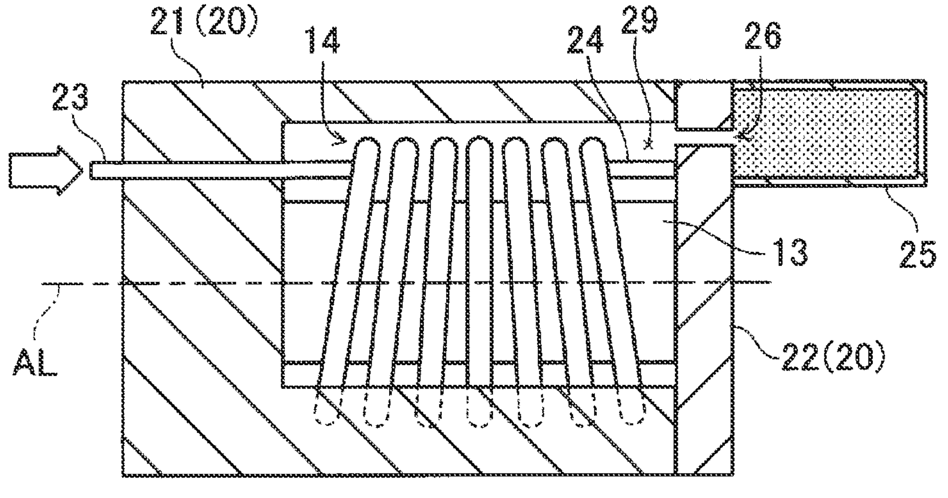
FIG. 8 is a view useful for describing a second process of the method of manufacturing the reactor.

The molten resin is injected into a cavity 29 of the mold 20 while a force parallel to the axis AL is applied to one side of the axis AL of the coil 14, so that one end (the lower end in the figures) of each gap between adjacent turns of the winding when the coil 14 is viewed from one side becomes wider than the other end (the upper end in the figures). In this manner, the resin cover 16 covering the coil 14 and the core 13 is formed such that the coil 14 is exposed at one side (the lower end in the figures). As shown in FIG. 8, the pressure pin 23 and the receiving pin 24 apply the force parallel to the axis AL to the upper side of the axis AL of the coil 14. In FIG. 8, the white arrow indicates the force applied to the coil 14. In other words, on the upper side of the axis AL, the coil 14 is sandwiched between the pressure pin 23 and the receiving pin 24. Then, the spacing between adjacent turns of the winding of the coil 14 is narrowed on the upper side of the axis AL. Namely, the spacing between the turns of the winding at the lower end of the coil 14 becomes wider than the spacing at the upper end of the coil 14. The gate 26 is opened in this condition, and the molten resin is injected from the plunger 25 into the cavity 29. The lower end of the coil 14 is isolated from the molten resin because it is covered by the first mold 21. When the resin hardens, the lower side of the coil 14 is exposed, and the resin cover 16 covering the remaining part of the coil 14 and the core 13 is formed. The mold 20 is opened, and a subassembly 12*a* in which the resin cover 16 is formed is taken out of the mold 20 (see FIG. 9)

Third Process

Figure 10:
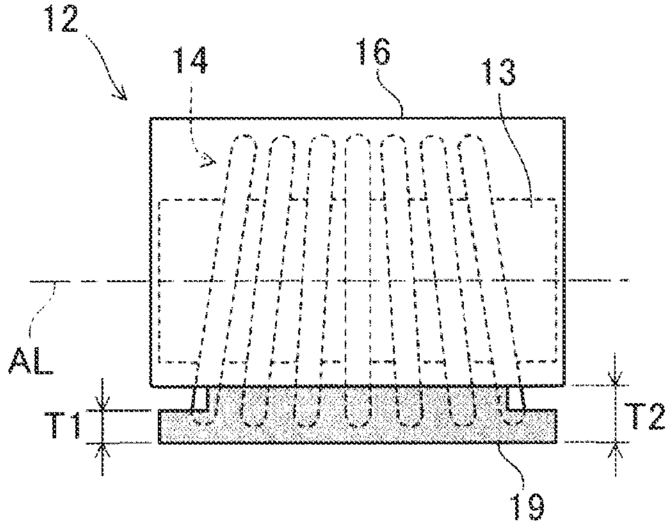
FIG. 10 is a view useful for describing a third process of the method of manufacturing the reactor.

The heat-dissipating material 19 is attached to the exposed portion 14*a* of the coil 14 (FIG. 10). The heat-dissipating material 19 is inserted between adjacent turns of the winding of the coil 14, and is attached to the coil 14 such that the thickness T1 of the heat-dissipating material 19 outside the coil in the direction of the axis AL is smaller than the thickness T2 of the heat-dissipating material 19 between the turns of the winding. Finally, the reactor 12 is attached to a base, which is not illustrated in the drawings. In this manner, the reactor 12 is completed.

In the reactor 12 produced by the above manufacturing method, the gap between adjacent turns of the coil 14 in its portion where the reactor 12 is exposed from the resin cover 16 is widened as the distance from the core 13 increases. The gap where the spacing gradually widens is filled with the heat-dissipating material 19. Thus, the heat-dissipating material 19 is less likely or unlikely to peel off from the winding.

The heat-dissipating material 19 is attached to the exposed portion 14*a* of the coil 14. The thickness T1 of the heat-dissipating material 19 outside the coil in the direction of the axis AL is smaller than the thickness T2 of the heat-dissipating material 19 between the turns of the winding. Thus, it is possible to reduce the amount of the heat-dissipating material 19 used, without affecting the cooling performance to the coil 14.

Figure 9:
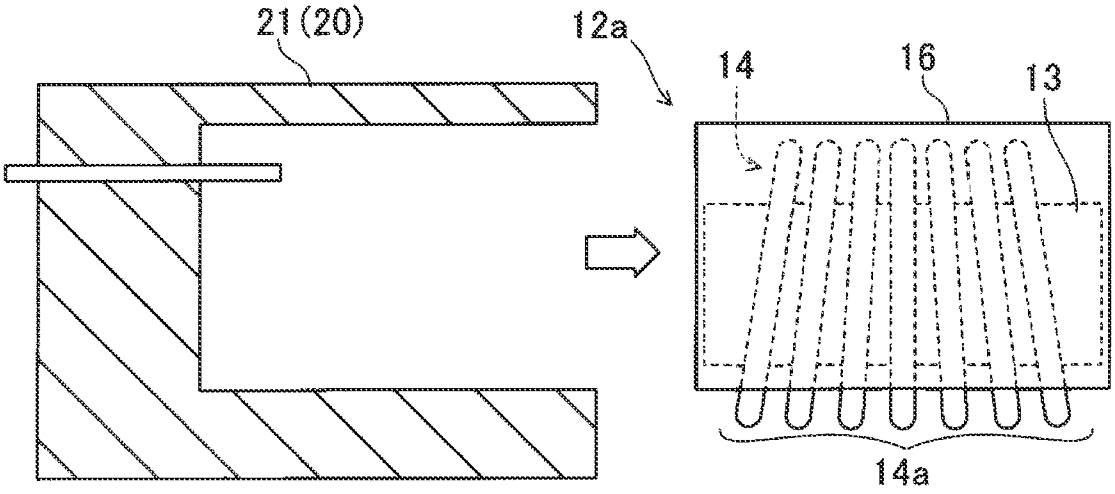
FIG. 9 is a view useful for describing the second process of the method of manufacturing the reactor.

In FIG. 7 to FIG. 9, only one pressure pin 23 for pressing one side of the axis AL of the coil 14 is depicted. Two or more pins may be used for pressing the coil 14 in the axial direction at one side of the axis AL. Alternatively, a single wide pin may be used for pressing the coil 14 in the axial direction at one side of the axis AL.

In some embodiments, the outermost turn of the winding in the direction of the axis AL may be inclined one degree or more with respect to the middle turn.

The mold 20 used in the manufacturing method of the embodiment can be realized by merely adding the pressure pin 23 and the receiving pin 24 to a conventional mold. The device used in the manufacturing method of the embodiment can be realized at a low cost.

Some points to be noted in connection with the technology described in the embodiment will be stated. The reactor of the embodiment has the ring-shaped core and the two coils. The technology disclosed in this specification may also be applied to a reactor including a straight core and one coil.

The heat-dissipating material may be in sheet form. The heat-dissipating material may be a potting material that is initially gelatinous and solidifies when exposed to air (or when heated).

While specific examples of the disclosure have been described in detail, these are for illustrative purposes only, and do not limit the appended claims. The technologies described in the claims include those obtained by modifying or changing the illustrated examples in various ways. The technical elements described in the specification or drawings exhibit technical usefulness alone or in various combinations, and are not limited to the combination described in the claims as filed. Also, the technology illustrated in the specification or drawings can achieve two or more objects at the same time, and has the technical usefulness when achieving one of the objects.

What is claimed is:

1. A reactor comprising:

a coil having a gap between adjacent turns of a winding;

a core inserted through the coil; and a heat-dissipating material that is in contact with a side face of the coil, wherein the heat-dissipating material is inserted between the adjacent turns of the winding of the coil, and a thickness of the heat-dissipating material outside the coil in a direction of an axis of the coil is smaller than a thickness of the heat-dissipating material between the adjacent turns of the winding, and wherein, on one side of the coil with which the heat-dissipating material is in contact, a spacing between the adjacent turns of the winding is wider as a distance from the core is larger.

2. The reactor according to claim 1, wherein the heat-dissipating material surrounds the winding in a cross section cut in a plane passing the axis of the coil and the heat-dissipating material.

3. The reactor according to claim 2, wherein the heat-dissipating material is in contact with the core.

4. The reactor according to claim 1, further comprising a resin cover that covers the coil and the core such that the coil is exposed at one side.

5. A method of manufacturing a reactor, comprising:

setting a coil having a gap between adjacent turns of a winding of the coil, and a core inserted through the coil, in a mold;

applying a force parallel to an axis of the coil to one side of the axis of the coil such that one end of the gap becomes wider than the other end as seen in a side view of the coil, and forming a resin cover that covers the coil and the core such that the coil is exposed at one side; and forming a heat-dissipating material that enters the gap between adjacent turns of the winding of the coil and is in contact with a side face of the coil in a portion of the coil that is exposed from the resin cover, wherein a thickness direction of the heat-dissipating material outside the coil in a direction of the axis of the coil is smaller than a thickness of the heat-dissipating material between the adjacent turns of the winding of the coil, and wherein, on one side of the coil with which the heat-dissipating material is in contact, a spacing between the adjacent turns of the winding is wider as a distance from the core is larger.

6. The method according to claim 5, wherein the coil is sandwiched between a pressure pin and a receiving pin, and the force parallel to the axis is applied by the pressure pin.

7. The method according to claim 5, wherein the resin cover is formed by injecting molten resin into a cavity of the mold, and is taken out of the mold.

* * * * *